United States Patent
Ebers et al.

(10) Patent No.: US 9,442,959 B2
(45) Date of Patent: Sep. 13, 2016

(54) IMAGE SEARCH REFINEMENT USING FACETS

(75) Inventors: Bjoern-Ole Ebers, Halstenbek (DE); Sven Duwenhorst, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 146 days.

(21) Appl. No.: 13/507,433

(22) Filed: Jun. 28, 2012

(65) Prior Publication Data

US 2014/0006385 A1    Jan. 2, 2014

(51) Int. Cl.
*G06F 17/30*    (2006.01)
(52) U.S. Cl.
CPC ............................... *G06F 17/30274* (2013.01)
(58) Field of Classification Search
None
See application file for complete search history.

(56) References Cited

U.S. PATENT DOCUMENTS

| | | | |
|---|---|---|---|
| 6,182,069 B1 * | 1/2001 | Niblack et al. | |
| 2004/0249809 A1 * | 12/2004 | Ramani et al. | 707/4 |
| 2006/0080347 A1 * | 4/2006 | Potts et al. | 707/101 |
| 2008/0086451 A1 * | 4/2008 | Torres et al. | 707/3 |
| 2008/0212899 A1 * | 9/2008 | Gokturk et al. | 382/305 |
| 2009/0307629 A1 * | 12/2009 | Horiuchi et al. | 715/810 |
| 2010/0121834 A1 * | 5/2010 | Ahola | 707/708 |
| 2011/0137921 A1 * | 6/2011 | Inagaki | 707/749 |
| 2012/0158686 A1 * | 6/2012 | Hua et al. | 707/706 |
| 2012/0166472 A1 * | 6/2012 | Hoppenot et al. | 707/769 |
| 2014/0074852 A1 * | 3/2014 | Sud et al. | 707/741 |

* cited by examiner

*Primary Examiner* — Anh Tai Tran
(74) *Attorney, Agent, or Firm* — Kilpatrick Townsend & Stockton LLP

(57) ABSTRACT

One exemplary embodiment involves generating a plurality of facets and descriptors of all items available via an electronic shop service based on the images depicting each of the items. The facets that may be generated include a color facet, a shape facet, a texture facet, and/or other facets. The embodiment further involves receiving search criteria from a user that includes a number of search criteria elements. Each element of the search criteria may be represented by an image. The embodiment involves generating a search criteria descriptor based on the images received in connection with the search criteria. Additionally, the embodiment involves identifying items associated with images that correspond with the search criteria descriptor and providing the images of the identified items in a user interface.

30 Claims, 6 Drawing Sheets

IMAGE SEARCH REFINEMENT USING FACETS

FIELD

This disclosure relates generally to computer software and more particularly relates to the creation, modification, use, and distribution of electronic content.

BACKGROUND

In a conventional electronic commerce system, a user may request to receive a listing of items for purchase from the electronic commerce system. For example, the user may request to receive items that satisfy a search criterion, such as, an item name, shape, color, price, manufacturer name, type of material, and/or other criteria. Upon receiving the request by the user, the electronic commerce system presents the items that correspond to the search criterion in a user interface, such as a web site rendered by a browser.

According to one conventional technique, each item available through the electronic commerce system may have been tagged based on the attributes of the item. The attributes of the item are included in metadata associated with the item via a manual tagging process. Alternatively, the attributes of the item may be associated with the item by employing a file name naming convention to encode the attribute information. In response to receiving the user request, the electronic commerce system presents the items that correspond to the search criterion by comparing the metadata associated with each item and the search criterion. However, the items that correspond with the search criterion are unordered and/or unranked with respect to a similarity of the items. Another search may be necessary to further filter the items for identifying similarities between the items. Thus, two searching queries may be necessary to first identify the items that correspond to the search criterion and then rank the items according to a similarity. Further, significant resources may be necessary for creating and maintain a metadata database and for engaging in the manual tagging process.

SUMMARY

One exemplary embodiment involves generating facets and descriptors of items available via an electronic shop service from the images depicting the items. The embodiment further involves receiving a search request, from a requesting source, that includes search criteria involving a number of images. Additionally, the embodiment may involve generating a search criteria descriptor based at least in part on the received images. The embodiment may also involve identifying items that correspond to the search criteria descriptor and providing images depicting the identified items in a user interface to the requesting source.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

The file of this patent contains at least one drawing executed in color. Copies of this patent with color drawing(s) will be provided by the Patent and Trademark Office upon request and payment of the necessary fee. These and other features, aspects, and advantages of the present disclosure are better understood when the following Detailed Description is read with reference to the accompanying drawings, where.

DETAILED DESCRIPTION

Figure 1:
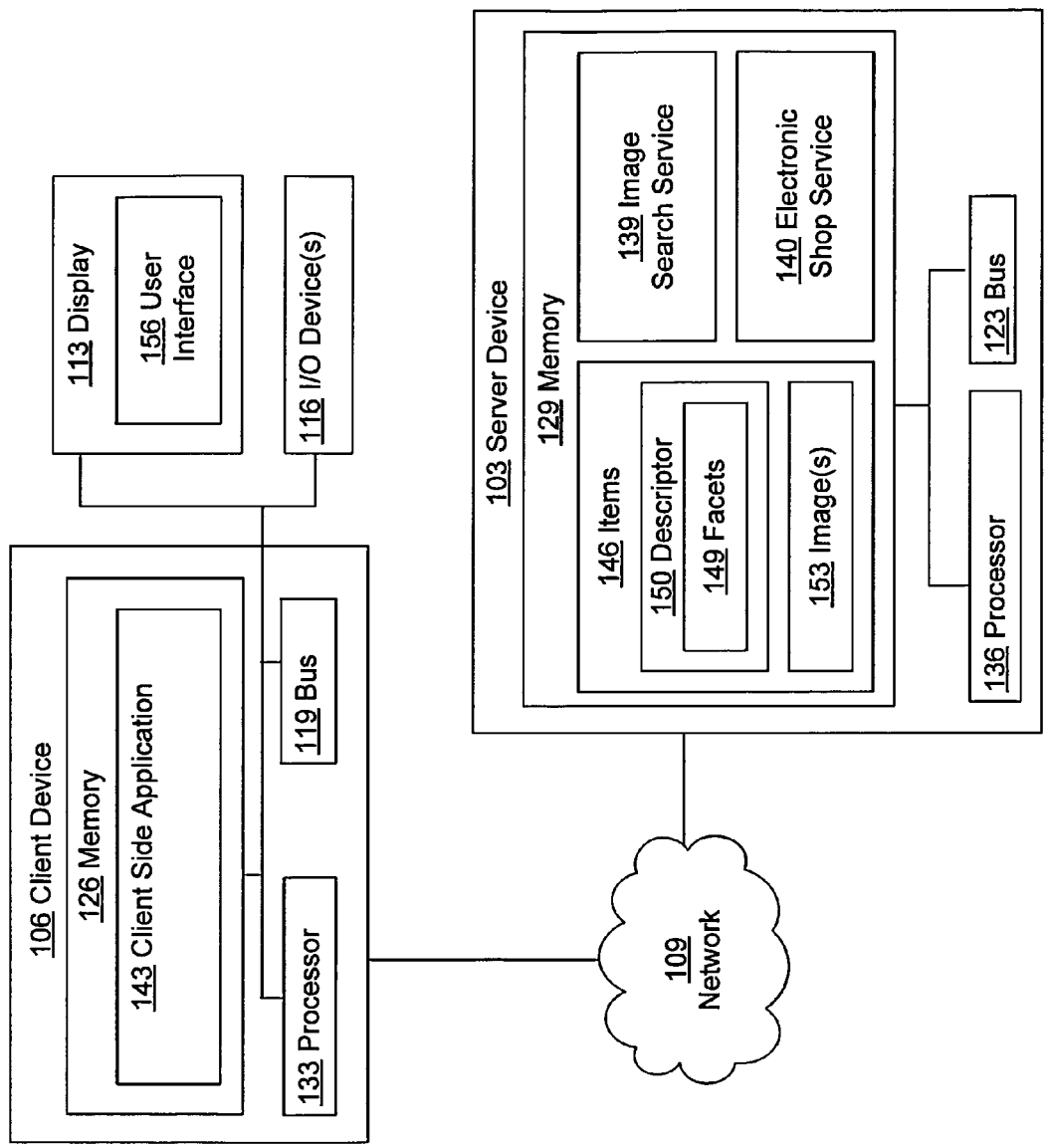
FIG. 1 is a block diagram depicting exemplary computing devices in an exemplary computing environment for implementing certain embodiments.

Methods and systems are disclosed for identifying similar items based on attributes identified in search images provided to an image search service. In one embodiment, items are tagged with descriptors based at least in part on facets generated from an image depicting the item. For example, in one embodiment, an image search service generates a color facet via a histogram computation of the image, and a texture facet via a texture facet via a Fourier transform computation. As another example embodiment, the image search service generates a shape facet by removing a background portion of the image to identify the shape of the item. The image search service then tags each item with a descriptor based on the generated facets that are determined from the image of the item. In one example, the descriptor is composed of sub-descriptors where each sub-descriptor corresponds to a subset of the generated facets. Having automatically tagged each item with a descriptor, the image search service can execute similarity searches based on the descriptor.

In one embodiment, a user submits a search request for identifying items available through an electronic shop service that is similar and/or corresponds to items depicted in images provided by the user. For example, the user may request to search for items having a similar shape as a shoe depicted in a first image but has a color of a belt depicted in a second image. The image search service may determine a search descriptor by generating a shape facet for the first image and a color facet for the second image. Then, the image search service determines whether any of the descriptors previously generated for the items available through the electronic shop service correspond to the search descriptor. In one example, the image search service determines whether a sub-descriptor that includes the shape facet and a color facet for the item available through the electronic shop service corresponds to the shape facet and the color facet identified from the search descriptor. Having identified the items that correspond to the similarity search, the image search service then provides the images of the similar items on a user interface provided to the user in a ranked order. For example, a distance function is employed to compute a distance between the search descriptor and the descriptor for each one of the identified items. The identified items are then ranked based at least in part on the distance values where the items having a smaller distance value are ranked higher than items having a larger distance value. Thus a ranked similarity search may be achieved via a single search without requiring manual tagging of the items.

These illustrative examples are given to introduce the reader to the general subject matter discussed here and are not intended to limit the scope of the disclosed concepts. The following sections describe various additional embodiments and examples with reference to the drawings in which like numerals indicate like elements.

FIG. 1 depicts an exemplary computing environment for performing searches based on search criteria as described herein. The methods and systems disclosed herein are also applicable on other computing systems and environments. The environment shown in FIG. 1 includes a wired or wireless network 109 connecting various devices 103 and 106. In one embodiment, the network 109 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 103 and 106 are respectively used as special purpose computing devices to provide specific functionality offered by their respective applications and by the interaction between their applications. As an example, client device 106 is shown with a display 113 and various input/output devices 116. A bus, such as bus 119 and bus 123, will typically be included in a device as well.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 103 and 106 each have a computer-readable medium such as memory 126 and 129 coupled to a processor 133 and 136 that executes computer-executable program instructions and/or accesses stored information. Such processors 133 and 136 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "server" refers to an application that listens for or otherwise waits for requests or a device that provides one or more such applications that listens for or otherwise waits for requests. Server device 103 is an example of a server. A "server device" may be used to perform the searching of items based on a received search criteria from the user. For example, the server device 103 may include an image search service 139 and an electronic shop service 140.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 1, client device 106 includes a memory 126 that includes a client side application 143. In one embodiment, the client side application 143 may be a browser that renders a user interface 156 on the display 113 associated with the client device 106. The client side application 143 may be executed to transmit a request to the server device 103 for accessing items 146. For example, a user on the client device 106 may request to access the items 146 by manipulating the user interface 156 rendered on the display 113. The client side application 143 may then transmit the request to an electronic shop service 140 and in response, receive a listing of the requested items 146. In one embodiment, upon receiving the listing, the client side application 143 may render the listing comprising the requested items 146 on the display 113.

The server device 103 includes a memory 129 that comprises an image search service 139, the electronic shop service 140, and a plurality of items 146 available for purchase via the electronic shop service 140. In one embodiment, each one of the items 146 is associated with a descriptor 150 and one or more images 153. The descriptor 150 includes one or more facets 149 that describe various visual features of the items 146, such as, for instance, a color facet, a shape facet, a texture facet, and/or any other visual feature discernible from the image 153. Additionally, the one or more images may each depict the same item from different angles, under different lighting, in different zoom levels, and/or from other aspects that are different.

The electronic shop service 140 facilitates the online purchase of items 146 over the network 109. The electronic shop service 140 also performs various backend functions associated with the online presence of a merchant in order to facilitate the online purchase of the items 146. For example, the electronic shop service 140 generates network pages such as web pages or other types of network content that are provided to clients 106 for the purpose of selecting items for purchase, rental, download, lease, or other form of consumption.

The image search service 139 may generate the facets 149 via a variety of computations known in the art. For example, the image search service 139 may generate a color facet 149 for an item 146 by performing a color histogram technique on the image 153 associated with the item 146. A color histogram may represent a number of pixels in the image 153, a range of colors that exist in the image 153, a distribution of the color range over a number of pixels, and/or other representation of the distribution of colors in the image 153, as is known in the art. The color histogram produces a color profile that represents a global set of information that describes all of the colors present in the image 153. In one embodiment, the color profile is compressed and converted to a bag of words form. Thus, the color histogram may be represented by a number of characters.

The image search service 139 may generate a texture facet 149 for an item 146 by performing a fast Fourier transform on the image 153 associated with the item 146. A fast Fourier transform computes the discrete Fourier transform of a signal and its inverse, as is known in the art. The image search service 139 may perform the fast Fourier transform to determine the frequency distribution of the image 153 to identify the texture of the item 146 being depicted by the image 153. For example, the image search service 139 may determine that the texture of the item 146 being depicted by the image 153 is similar to cloth, leather, plastic, suede, and/or any other type of material. In one embodiment, the image search service 139 may employ a scale-invariant feature transform (SIFT) technique to detect and describe the texture of the item 146 depicted in the image 153. For example, the image search service may capture a global texture energy distribution of the image 153 from the SIFT technique.

Additionally, the image search service 139 may generate a shape facet 149 for an item 146 by removing the background portion of the image 153 depicting the item 146 to identify the shape. For example, the image 153 may depict the item 146 with a background being white and/or other color. In this example, the image search service 139 may remove the background using a technique known in the art and the resulting image provides the shape of the item 146. In one embodiment, the image search service 139 may detect the color of the background portion (for example, an outer most portion of the image 153) and ignore all pixels of the image 153 that correspond to the color of the background portion.

In one embodiment, the image search service 139 generates the facets 149 for each of the items 146 (for example, the color facet, the texture facet, the shape facet, and/or other facets) upon a first implementation of the image search service 139 on the server device 103. For example, the image search service 139 may access the images 153 associated with each of the items 146 on the first implementation and perform the techniques described herein to generate the facets 149. In another embodiment, the image search service 139 may generate the facets 149 on a periodic basis thereby re-generating the facets 149 for each item 146 upon each implementation. For example, the images 153 of the items 146 may be updated and/or revised such as, for instance, when a latest model of an item 146 becomes available for purchase via the electronic shop service 140. In this example, the facets 149 of the item 146 may be regenerated based on the new image 153 depicting the latest model of the item 146. Additionally, new items 146 may become available via the electronic shop service 140 on a periodic basis. By implementing the image search service 139 on a periodic basis, the image search service 139 may generate facets 149 for new items 146 and revised items 146.

In yet another embodiment, the image search service 139 may generate only the facets 149 of new items 146 and revised items 146 upon receiving an indication of availability of the new items 146 and the revised items 146. Further, the image search service 139 may be invoked by the electronic shop service 140 when new items 146 and/or revised items 146 are available for purchase and/or other consumption. Additionally, the electronic shop service 140 may invoke the image search service 139 to generate the facets 149 for all or a portion of the items 146, and/or re-generate the facets 149 for all or a portion of the items 146. The electronic shop service 140 may also invoke the image search service 139 for the generation and/or re-generation of the facets 149 on a random basis and/or other basis, as can be appreciated.

In one embodiment, the facets 149 may be represented by a descriptor 150 that describes the attributes represented by all of the facets 149 of the item 146. For example, the descriptor 150 may be a character string, a sequence of words, a bag of words, and/or another format. As another example, the descriptor 150 may be represented by a vector of normalized values where each unit in the vector corresponds to a facet. Additionally, each descriptor 150 may be composed of one or more sub-descriptors that includes a subset of the generated facets 149. As an example, one sub-descriptor may correspond to the color facet 149 and the texture facet 149, another sub-descriptor may correspond to the texture facet 149 and the shape facet 149, and a third sub-descriptor may correspond to the shape facet 149 and the color facet 149. Thus, the combination of sub-descriptors that form the descriptor 150 describes the facets 149 of the item 146.

In addition to generating the facets 149 for the images 153 of each item 146 and generating a descriptor 150 for an item 146, the image search service 139 executes search queries received from a user on the client device 106. In one embodiment, the image search service 139 may identify items 146 that correspond to the search request received from the user based on the images 153 associated with the items 146. For example, the image search service 139 may determine that an item 146 corresponds to the search request if one or more facets 149 describing the image 153 associated with the item 146 satisfies one or more criteria of the search request. Once the items 146 that satisfy the search request have been identified, the image search service 139 includes the items 146 in a user interface, such as a web page and/or other network page, transmitted to the client device 106 of the user for rendering on the display 113.

The image search service 139 searches for similar items 146 available through the electronic shop service 140. In other embodiments, the items 146 may be available through a traditional brick and mortar shop. For example, the image search service 139 may identify the desired items and provide the user with a location, such as an aisle and/or rack number, of where to find the desired items. Additionally, in another embodiment, the items 146 may be soundtracks and/or albums that are available through a record store. In this embodiment, the facets 149 of the item 146 may include a sound pressure facet, a frequency facet, a spectral shape facet, and/or other facets that uniquely describe a sound track. Here, the facets 149 of the soundtracks may be generated via techniques known in the art and a descriptor 150 generated for each soundtrack. The image search service 139 may receive a search request to identify other soundtracks similar to a search soundtrack. In response, the image search service 139 may identify the similar soundtracks based on the descriptor 150, as discussed herein.

Figure 2:
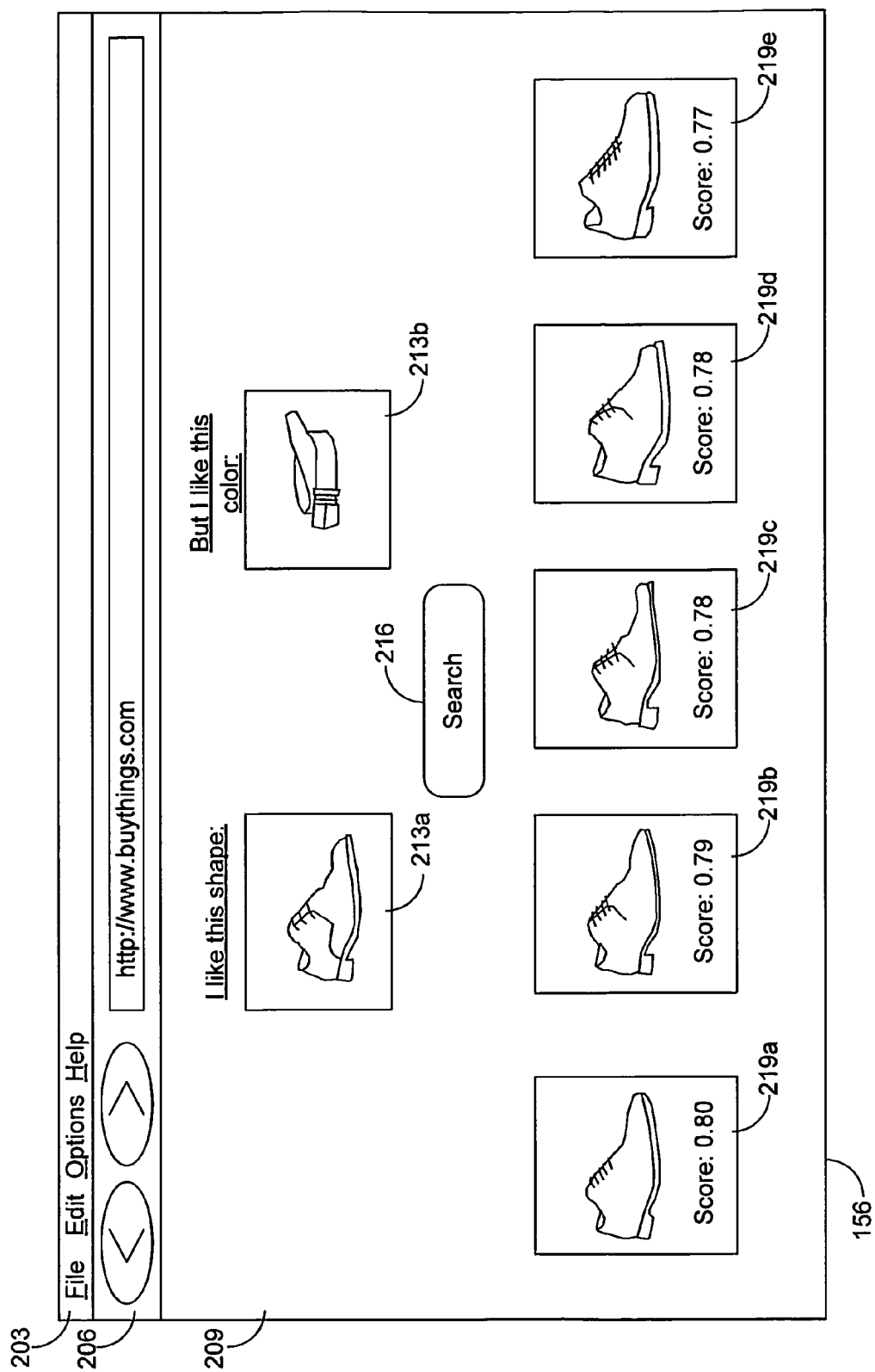
FIG. 2 illustrates an exemplary user interface rendered on a display associated with a client device.

FIG. 2 shows one example of a user interface 156 according to one embodiment disclosed herein. The graphical components depicted in the user interface 156 such as blocks comprising information shown in FIG. 2 are merely examples of the various types of features that may be used to accomplish the specific function noted. The user interface 156 can be rendered on a display, such as a display 113 (FIG. 1) associated with the client device 106 (FIG. 1). In another embodiment, FIG. 2 may be viewed as depicting the display output of the client side application 169 (FIG. 1).

As shown in FIG. 2, the user interface 156 is a web page that includes a menu panel 203, a navigation panel 206, and a content panel 209. The menu panel 203 includes one or more menus for manipulating the web page, such as a "file" menu, an "edit" menu, an "option" menu," a "help" menu, and/or other menus. The navigation panel 206 includes one or more navigation controls for navigating to other web pages, as can be appreciated. For example, the navigation panel 206 includes a back button for navigating to a previous web page and/or a previous user interface, a forward button for navigating to a next web page and/or a next user interface, and an address box for inputting an address such as Uniform Resource Locator (URL) for navigation.

Additionally, the content panel 209 includes a variety of content presented by the image search service 139. For example, the content panel 209 includes criteria containers 213, a search button 216, and result containers 219, and/or other components not depicted. In one embodiment, the criteria containers 213a and 213b include an image 153 (FIG. 1) of an item 146 (FIG. 1) available for purchase, rent, download and/or other consumption via the electronic shop service 140 (FIG. 1). The images 153 in the criteria containers 213 may be selected by the user and represent search criteria with which the image search service 139 performs the search request. In one embodiment, the user may select the images 153 to be included in the criteria containers 213 from a collection of images stored locally on the client device 106, provided in another web page transmitted by the image search service 139, and/or from another source. The images 153 may be compressed according to a one of a variety of compression standards known in the art.

In this example, the criteria containers 213 each correspond to one of the facets 149 that can be generated by the image search service 139. For example, the criteria container 213a may correspond to the shape facet 149 and the criteria container 213b may correspond to the color facet 149. In one embodiment, the user may submit an image 153 of an item 146 having a desired shape to be included in the criteria container 213a as one element of the search criteria. The user may also submit an image 153 of an item 146 having a desired color to be included in the criteria container 216a as another element of the search criteria. By invoking the search button 216, the user may transmit a request to receive a listing of items that satisfy the elements of the search criteria as defined by the images in the criteria containers 213a and 213b. In this example, the elements of the search criteria include a shape that corresponds to the image 153 provided in the criteria container 213a and the color that corresponds to the image 153 provided in the criteria container 213b. As shown here, the user desires to see items available that are of the same shape as the shoe depicted in the criteria container 213a but of the same color as the belt depicted in the criteria container 213b. For instance, the shoe depicted in criteria container 213a may be a Ferragamo® shoe having a unique shape and the belt depicted in criteria container 213b may be of a black color. Thus, the user may desire to search for a shoe that has a shape corresponding to the Ferragamo® shoe but has a color corresponding to the black color of the belt.

In other embodiments, additional criteria containers 213 may be provided in the user interface 156 for the user to specify additional elements of the search criteria. For example, the user may wish to provide additional elements such as a texture of the item 146, and/or other elements that correspond to the facets 149 of the items 146. As another example, the facets 149 of the items may be any other component of a visual descriptor that can be computed from an image and/or other sample depicting the item.

When the user invokes the search button 216 to transmit the request, the image search service 139 (FIG. 1) receives the request and provides the images 153 included in each of the result containers 219. In one embodiment, the request transmitted by the user includes the images provided by the user in the criteria containers 213. Upon receipt, the image search service 139 generates a search criteria descriptor that correspond to each of the criteria containers 213. For example, the image search service 139 generates a shape facet 149 for the image provided by the user in criteria container 213a and generates a color facet 149 for the image provided by the user in the criteria container 213b. Alternatively, the facets 149 may be identified by retrieving stored information associating the facets 149 to the images 153.

The image search service 139 then generates the search criteria descriptor from the color facet 149 and the shape facet 149. For example, the search criteria descriptor may be represented by a character string and/or some other form that includes at least two facets. The first facet corresponds to the color facet 149 and the second facet corresponds to the shape facet 149. Having determined the search criteria descriptor, the image search service 139 then identifies the items 146 that satisfy the search criteria based on the search criteria descriptor.

In one embodiment, the image search service 139 identifies all of the items 146 that correspond to the search criteria descriptor. For example, the image search service 139 identifies the items by determining whether the descriptors 150 of the available items 146 correspond to the search criteria descriptor as generated from the images provided by the user. To this end, the image search service 139 may determine whether the search criteria descriptor appears as a descriptor 150 and/or as a portion of a descriptor 150 (i.e., a sub-descriptor) stored in the memory 129 of the server device 103. For example, the search criteria descriptor may appear a sub-descriptor of the descriptor 150 where the sub-descriptor corresponds to the generated color facet 149 and the shape facet 149.

Referring to the above example, the image search service 139 determines whether the descriptor 150 for each item 146 corresponds to the shape facet 149 generated from the image of the criteria container 213a. The image search service 139 also determines whether the same descriptor 150 corresponds to the color facet 149 generated from the image of the criteria container 213b. Thus, the image search service 139 may determine that an item 146 satisfies the search criteria when the descriptor 150 associated with the item 146 includes at least the two facets that correspond to the shape facet 149 and the color facet 149 of the images from the criteria containers 213. Having identified the items 146 that satisfy the search criteria, the image search service 139 then generates a user interface 156 (for example, a web page) that includes the images 153 of the identified items 146. For example, the images 153 depicting the identified items 146 may be included in the results containers 219a-219e.

In one embodiment, images 153 included in the user interface 156 may be ordered based on a score and/or a rank generated by the image search service 139. For example, the image search service 139 may generate a score for each image 153 of the identified items 146 indicating a similarity of the identified image 153 to the search criteria. The score may be based on a distance between identified image 153 and the search criteria. For example, a distance function may compute the distance between the descriptor 150 of identified image 153 and the descriptor generated from the search criteria. The identified images 153 are ranked such that identified images 153 having a smaller distance to the search criteria are ranked higher than the identified images 153 having a larger distance to the search criteria. Additionally, the similarity score for each image 153 depicting the identified items 146 may be included on the user interface 156.

In another embodiment, the user interface 156 may include one or more components for the user to apply a weight to certain elements of the search criteria. For example, the user may submit search criteria that include three or more elements. In this example, the user may individually apply a weight to each of the elements to turn "on" and turn "off" the respective element. The search criteria may include a shape, color, and texture facet. For instance, the user interface 156 may include a criteria container 213a for an image having a desired shape, a criteria container 213b for an image having a desired color, and a criteria container 213c for an image having a desired texture. Thus, each of elements has an equal weight in the search criteria (i.e., the shape element is ⅓ of the search criteria, the color element is ⅓ of the search criteria, and the texture element is ⅓ of the search criteria). In one embodiment, the user may wish to turn off one of the elements of the search criteria, such as, for instance, the color element. Accordingly, the user may apply a weight of "0" to the criteria contain 213b, by invoking a button and/or otherwise providing the indication. Thus the shape and the texture as the only two remaining elements of the search criteria. In this instance, the weight of the shape element and the texture element may be equal (i.e., the shape element is ½ of the search criteria and the texture element is ½ of the search criteria). When the user invokes the search button 216 to submit the request, the image search service 139 may only identify items that satisfy the elements of search criteria having a weight. For instance, the image search service 139 may only identify items 146 that correspond to the desired shape and texture. In another embodiment, the user may apply any other weight to each of the elements of the search criteria so long as the total weight of all of the elements of the search criteria do not exceed 1.

Figure 3:
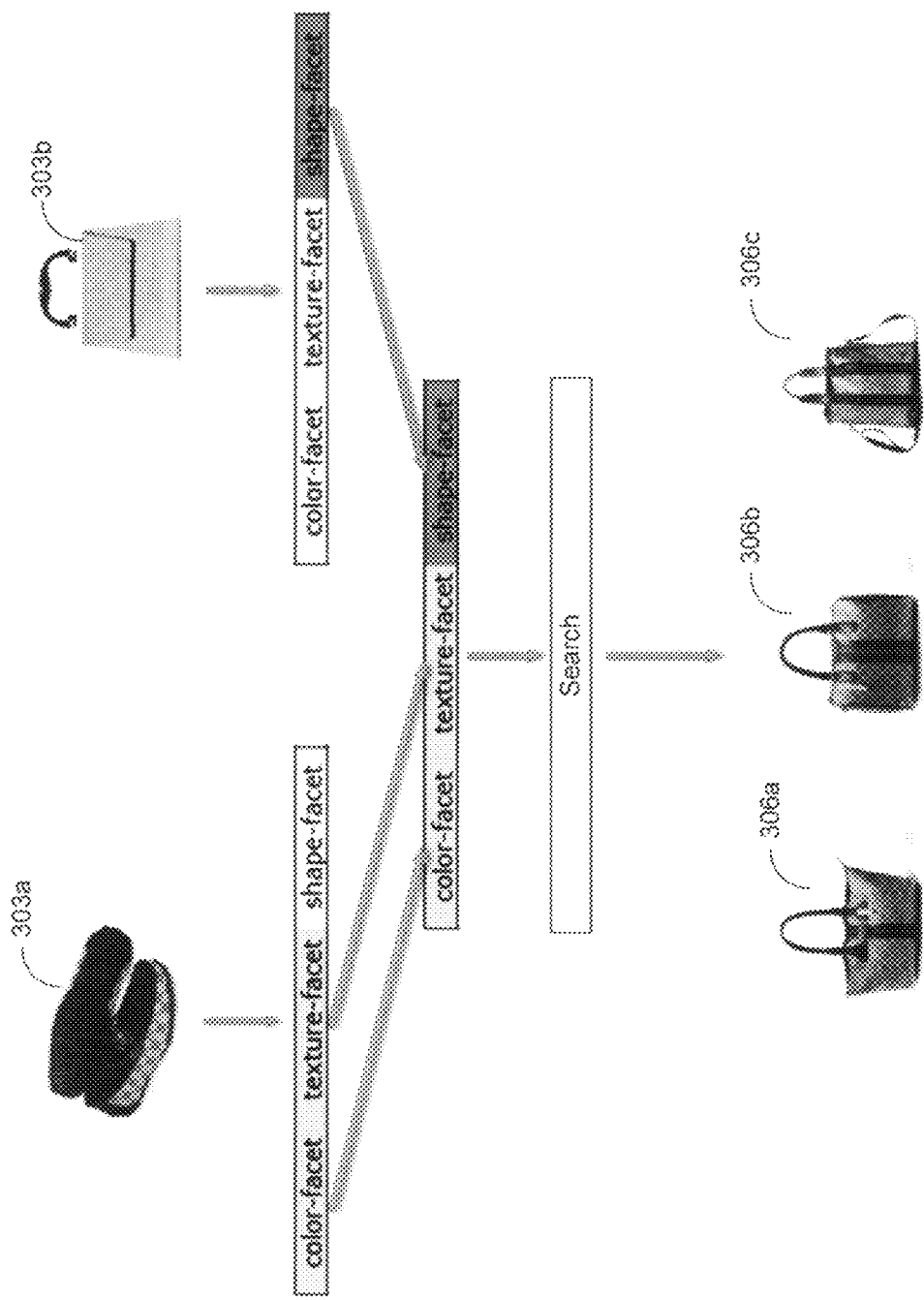
FIG. 3 illustrates an exemplary embodiment of the image search refinement approach described herein.

FIG. 3 shows illustrates an exemplary embodiment of the search refinement approach disclosed herein. FIG. 3 includes search images 303a and 303b, and search results 306a, 306b, and 306c. In one embodiment, a user may define a set of search criteria by providing the search images 303a and 303b via a user interface 156 (FIG. 1). For example, the user may provide the search images 303a and 303b via one or more criteria containers 213 (FIG. 2) presented on a user interface 156 as discussed above. Additionally, the user providing the search images 303a and 303b may indicate one or more facets 149 (FIG. 1) of the search images 303a and 303b to define the search criteria. For example, the user may define the search criteria by indicating to search for items 146 (FIG. 1) having a substantially similar color facet 149 and texture facet 149 of the first search image 303a and a substantially similar shape facet 149 as the second search image 303b.

The image search service 139 (FIG. 1) may receive the search images 303a and 303b and the indication of the facets 149. For instance, the image search service 139 receives the first search image 303a and the indication by the user to search for items 146 having a similar color facet 149 and a texture facet 149 as the first search image 303a. Similarly, the image search service 139 receives the second search image 303b and the indication by the user to search for items 146 having a similar shape facet 149 as the second search image 303b. In response, the image search service 139 constructs a search criteria descriptor that corresponds to the user input. For example, the image search service 139 generates the search criteria descriptor to include the color facet 149 of the first search image 303a, the texture facet 149 of the first search image 303a, and the shape facet 149 of the second search image 303b.

The image search service 139 then identifies all of items 146 that correspond to the search criteria descriptor. For example, the image search service 139 identifies the items 146 by determining whether the descriptors 150 associated with the available items 146 correspond to the search criteria descriptor constructed from the user input. In one embodiment, the image search service 139 may determine that an item 146 corresponds to the search criteria descriptor if the descriptor 150 associated with the item 146 includes at least all of the facets 149 that define the search criteria descriptor. Then, the image search service 139 provides the images 153 associated with the identified items 146 as the search results 306. For example, the image search service 139 may provide the images 153 of the identified items 146 as the search result images 306a, 306b, and 306c. The search result images 306a, 306b, and 306c provided by the image search service 139 have a color facet 149 and a texture facet 149 substantially similar to the first search image 303a and a shape facet 149 substantially similar to the second search image 303b.

Figure 4:
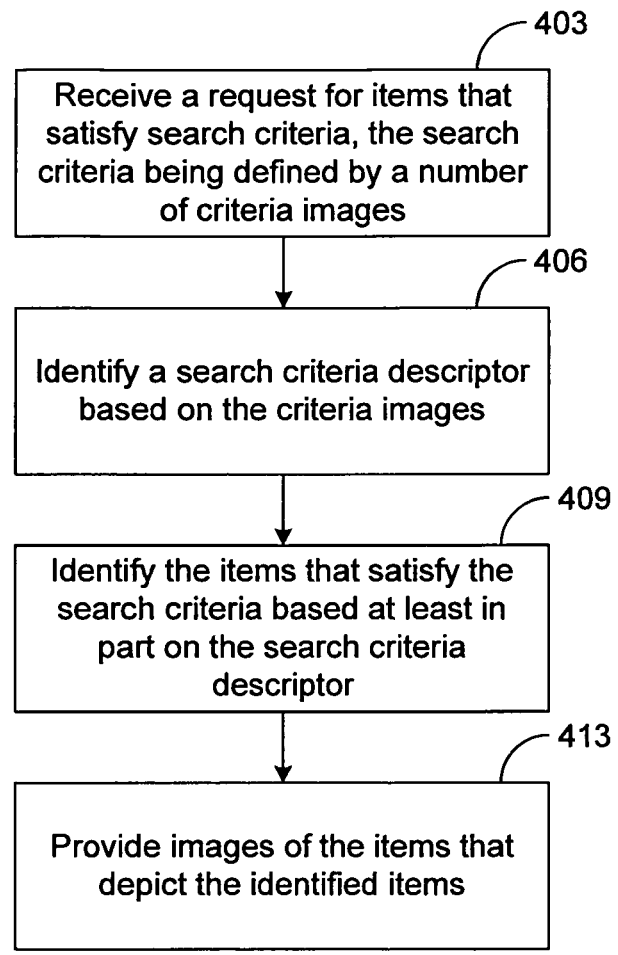
FIG. 4 is a flow chart illustrating an exemplary method of an image search service for receiving search criterion and providing images of items that satisfy the search criterion.

FIG. 4 is a flowchart that provides one example of the operation of a portion of the image search service 139 according to certain embodiments. It is understood that the flowchart of FIG. 4 provides merely an example of the many different types of functional arrangements that may be employed to implement the operation of the portion of the image search service 139 as described herein. As an alternative, the flowchart of FIG. 4 may be viewed as depicting an example of steps of a method implemented in the computing device 103 (FIG. 1) according to one or more embodiments.

Beginning with box 403, the image search service 139 receives a request for items that satisfy search criteria. In one embodiment, the image search service 139 receives a search criteria defined by a number of criteria images. For example, a user may provide images via a user interface 156 (FIG. 2) and may also define the search criteria by indicating one or more facets 149 (FIG. 1) of the images. For instance, the user may define the search criteria to indicate searching for items 146 that have a substantially similar color facet 149 as a first image provide by the user and a substantially similar shape facet 149 as a second image provided by the user.

In box 406, the image search service 139 identifies a search criteria descriptor based on the criteria images provided by the user. In one embodiment, the image search service 139 may generate the search criteria descriptor by combining the facets 149 of the criteria images indicated by the user. Using the above example, the image search service 139 may generate a search criteria descriptor that includes the color facet 149 of the first image and the shape facet 149 of the second image. In one embodiment, the image search service 139 may determine the color facet 149 and/or the shape facet 149 using one or more techniques described herein such as, a color histogram and/or other technique. In another embodiment, the image search service 139 may identify the respective facets from a descriptor associated with each of the criteria images.

Then, in box 409, the image search service 139 identifies the items 146 (FIG. 1) that satisfy the search criteria based at least in part on the search criteria descriptor. In one embodiment, the image search service 139 identifies the items 146 by comparing the descriptor 150 associated with each one of the items 146 with the search criteria descriptor. For example, the image search service 139 may determine that an item 146 satisfies the search criteria if the descriptor 150 associated with the item 146 includes at least all of the facets 149 of the search criteria descriptor. Referring to the above example, the image search service 139 may determine that an item 146 satisfies the search criteria if the descriptor of the item 146 has a substantially similar color facet and shape facet as the search criteria descriptor. Then, in box 413, the image search service 139 provides the images 153 (FIG. 1) that depict the identified items 146 to the user.

Figure 5:
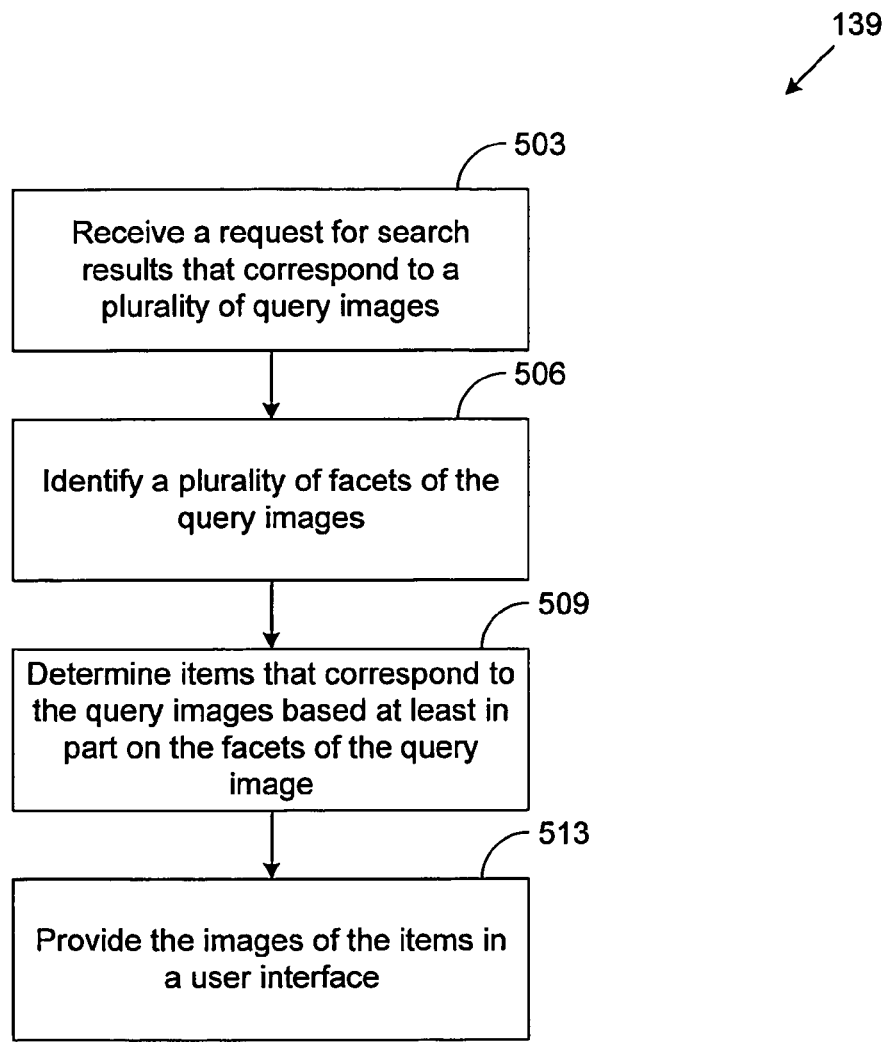
FIG. 5 is a flow chart illustrating an exemplary method of an image search service for receiving a search request and providing images of items that satisfy the search request.

FIG. 5 is a flowchart that provides one example of the operation of a portion of the image search service 139 according to certain embodiments. It is understood that the flowchart of FIG. 4 provides merely an example of the many different types of functional arrangements that may be employed to implement the operation of the portion of the image search service 139 as described herein. As an alternative, the flowchart of FIG. 5 may be viewed as depicting an example of steps of a method implemented in the computing device 103 (FIG. 1) according to one or more embodiments.

Beginning with box 503, the image search service 139 receives a search request for search results that correspond to a plurality of search images. In one embodiment, a user manipulating a user interface 156 (FIG. 1) may submit one search image that defines one element of the search request, such as, for example, a color, a shape, a texture, and/or another attribute of an item. Additionally, the user may submit a separate search image to define a separate element of the search request. For example, the user may submit one search image and indicate a feature of an item depicted in the image, such as a shape of the item, as being a first element of the search request. Similarly, the user may submit another search image and indicate a feature of an item depicted in the second image, such as a color of the item, as being the second element of the search request.

Then, in box 506, the image search service 139 identifies a plurality of facets 149 (FIG. 1) of the search images. In one embodiment, the image search service 139 determines the facets 149 based at least in part on conventional techniques known in the art. For example, the image search service 139 generates a color facet via a histogram technique, a texture facet via a fast Fourier transform technique, and the shape facet via a process involving removal of a background portion of the search image, as described above. Additionally, in another embodiment, the image search service 139 may determine only the facet 149 that corresponds to the element indicated by the user for each search image. In another embodiment, the image search service 139 may determine all facets, as described herein, for each search image.

Next, in box 509, the image search service 139 determine items 146 that correspond to the search images based at least in part on the facets of the search images. In one embodiment, the image search service 139 identifies items 146 available via an electronic shop service 140 (FIG. 1). For example, the image service 139 identifies the items 146 that correspond to the search image by determining whether the facets 149 associated with the items 146 correspond to the facets of the search images. In this example, the image search service 139 may determine that an item 146 corresponds to the search image if the facets of the search images all correspond to the facets 149 associated with the respective item 146.

Then, in box 513, the image search service 139 provides the images 153 associated with the identified items 146 to the user via a user interface 156 (FIG. 1). In one embodiment, the image search service 139 may present the images 153 in a results container 219 (FIG. 2) of the user interface 156, as described above. Additionally, the image search service 139 may rank the images 153 and present the images 153 in the ranked order based on a similarity score. For instance, the similarity score maybe determined based at least in part on a distance between the images 153 of the identified items 146 and the search images, as described above.

Figure 6:
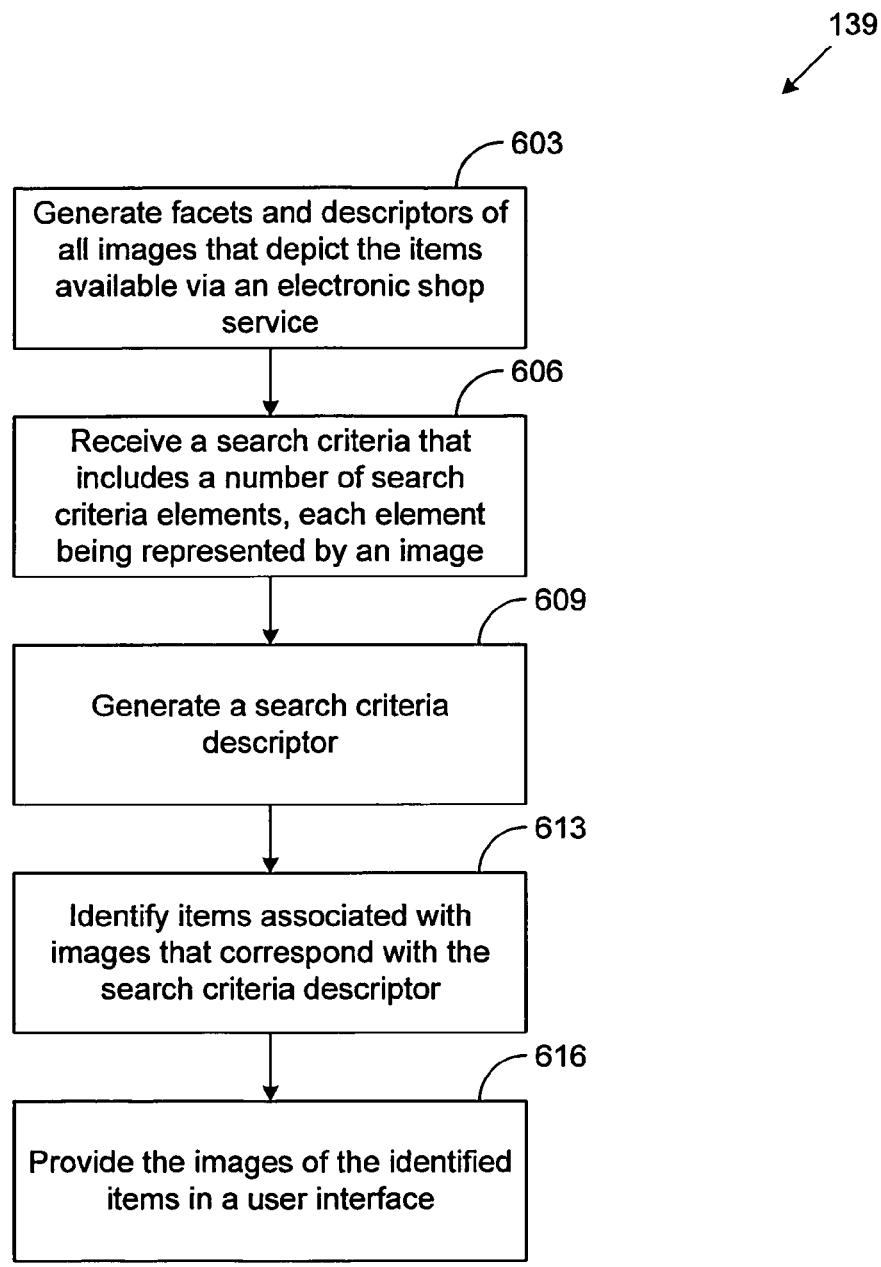
FIG. 6 is a flow chart illustrating another exemplary method of an image search service for receiving a search request and providing images of items that satisfy the search request.

FIG. 6 is a flowchart that provides one example of the operation of a portion of the image search service 139 according to certain embodiments. It is understood that the flowchart of FIG. 6 provides merely an example of the many different types of functional arrangements that may be employed to implement the operation of the portion of the image search service 139 as described herein. As an alternative, the flowchart of FIG. 6 may be viewed as depicting an example of steps of a method implemented in the computing device 103 (FIG. 1) according to one or more embodiments.

Beginning with box 603, the image search service 139 generates a plurality of facets 149 (FIG. 1) for all images 153 (FIG. 1) associated with the items 146 (FIG. 1) available for purchase and/or other consumption via the electronic shop service 140 (FIG. 1). In one embodiment, the image search service 139 generates the facets 149 on an initial basis. The image search service 139 may also re-generate the facets 149 on a periodic basis whenever new images 153 are made available and/or whenever new items 146 are made available via the electronic shop service 140. Further, the image search service 139 may generate the facets 149 by invoking a variety of techniques, as discussed above.

Additionally, the image search service 139 generates a descriptor for each item 146 based on the facets 149 of the item 146. In one embodiment, the descriptor may be determined by generating a number of facets that describe certain attributes of the item 146. For example, the image search service 139 may generate a color facet 149 via a color histogram technique as described above. The image search service 139 may generate a shape facet 149 via an approach for removing the background of image 153 depicting the item 149, as described above. Additionally, the image search service 139 may generate a texture facet 149 via a Fast Fourier transform technique, as described above. In other embodiments, the image search service 139 may generate other facets that correspond to a visual descriptor of an image 153, as can be appreciated.

Next, in box 606, the image search service 139, receives a search criteria that includes a number of search elements, each element being represented by an image. In one embodiment, the user may define the search criteria by providing a first image to define one element of the search criteria, a second image to define another element of the search criteria, and so on. For example, the user may provide the first image to define a shape of the item depicted in the image to be an element of the search criteria and the user may provide the second image to define a color of the item depicted in the image to be an element of the search criteria.

Then, in box 609, the image search service 139 generates a search criteria descriptor based on the images provided by the user. In one embodiment, the image search service 139 generates a descriptor for each image provided by the user. For example, the descriptor may be generated based on the facets of the item depicted by the image, as described above.

In one embodiment, the image search service 139 determines only the facet that corresponds to the search element indicated by the user. Using the example from above, the user may have provided a second image to indicate that the color of the item depicted in the second image is one element of the search criteria. Accordingly, the image search service 139 generates only a color facet (for example, via a histogram technique) based on the second image. Similarly, the image search service 139 generates a shape facet based on the first image. Having generated the facets, the image search service then generates a descriptor by merging and/or otherwise combining the facets of the image. Then, the image search service 139 combines the individual descriptors (i.e., the sub-descriptors) to generate the search criteria descriptor. Thus, the individual descriptors are sub-descriptors of the search criteria descriptor.

In box 613, the image search service 139 identifies the items 146 associated with images 153 that correspond with the search criteria descriptor. In one embodiment, the image search service 139 identifies the items 146 based on whether the descriptor 150 (FIG. 1) associated with each of the items 146 corresponds to the search criteria descriptor. For example, the image search service 139 may determine that the item 146 corresponds to the search criteria descriptor if the descriptor 150 associated with the item 146 corresponds to each of the sub-descriptors of the search criteria descriptor. Using the above example, an item 146 identified to correspond to the search criteria descriptor exhibits the shape of the item depicted in the first image provided by the user and embodies the color of the item depicted in the second image provided by the user.

Finally, in box 616, the image search service 139 provides the images 153 that correspond to the identified items 146 to the user on a user interface 156 (FIG. 1). In one embodiment, the image search service 139 includes the images 153 in a results container 219 (FIG. 2) that is then rendered on the display 113 (FIG. 1) of the client device 106 (FIG. 1) by the client side application 143 (FIG. 1). In another embodiment, the images 153 provided to the user may be ranked based on a similar score, as discussed above.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
    displaying to a user in a single user interface a first image of a first item and a second image of a second item, wherein the first item is a non-background portion of the first image and the second item is a non-background portion of the second image;
    displaying with the first image a plurality of facets of the first item and displaying with the second image a plurality of facets of the second item;
    receiving search criteria input comprising a selection by the user of one or more different facets of the first item and a weight for each of the one or more different facets of the first item and a selection by the user of one or more different facets of the second item and a weight for each of the one or more different facets of the second item;

communicating the search criteria input to an image search service, wherein the image search service generates a search descriptor based on the different facets and corresponding weights identified in the search criteria input and searches search-images to identify matched-images, each search-image tagged with a descriptor identifying an item in the search-image and facets of the item in the search-image, wherein the matched-images comprise search-images tagged with descriptors similar to the search descriptor; and receiving the matched-images from the image search service and providing the matched-images for display as search results in response to a search specifying the search criteria input.

2. The computer-implemented method of claim 1 wherein the search criteria comprises a selection by the user of a facet of the first item comprising a color of the first item, and a facet of the second item comprising a shape of the second item, and wherein the search descriptor comprises the color of the first item and the shape of the second item.

3. The computer-implemented method of claim 1, further comprising:

ranking the matched-images based on similarity between the search descriptor and a respective descriptor of each of the matched-images; and wherein providing the matched-images for display further comprises providing the matched-images in ranked order.

4. The computer-implemented method of claim 1, wherein generating the search descriptor based on the different facets and corresponding weights identified in the search criteria input comprises combining at least two different facets according to their respective corresponding weights as identified in the search criteria.

5. The computer-implemented method of claim 1, wherein the descriptor of each search-image comprises a vector of normalized values, each value corresponding to a facet of each search-image.

6. The computer-implemented method of claim 1, wherein the descriptor of each search-image comprises at least one of a character string, a sequence of words, or a set of words.

7. The computer-implemented method of claim 1, wherein the first image and the second image displayed depict a common item and each image depicts a different aspect of the common item.

8. The computer-implemented method of claim 1, wherein the first image and the second image depict different items.

9. The computer-implemented method of claim 1, wherein generating the search descriptor based on the different facets and corresponding weights identified in the search criteria input comprises combining all of the different facets according to their respective corresponding weights as identified in the search criteria.

10. The computer-implemented method of claim 1, wherein at least one of the one or more different facets of the first item or the one or more different facets of the second item comprises an audible feature, and wherein the audible feature comprises at least one of a sound-pressure-facet, a frequency-facet, or a spectral-shape-facet.

11. The computer-implemented method of claim 1, wherein each of the one or more different facets of the first item and each of the one or more different facets of the second item comprises at least one of a shape-facet, a color-facet, or a texture-facet.

12. The computer-implemented method of claim 11, wherein the color-facet uniquely identifies a color of the associated item, the texture-facet uniquely identifies a texture of the associated item, and the shape-facet uniquely identifies a shape of the associated item.

13. A system comprising:

a processor for executing instructions of a program application stored in computer-readable medium on one or more devices, the program application comprising one or more modules configured to perform the steps comprising:

displaying to a user in a single user interface a first image of a first item and a second image of a second item, wherein the first item is a non-background portion of the first image and the second item is a non-background portion of the second image;

displaying with the first image a plurality of facets of the first item and displaying with the second image a plurality of facets of the second item;

receiving search criteria input comprising a selection by the user of one or more different facets of the first item and a weight for each of the one or more different facets of the first item and a selection by the user of one or more different facets of the second item second item and a weight for each of the one or more different facets of the second item;

communicating the search criteria input to an image search service, wherein the image search service generates a search descriptor based on the different facets and corresponding weights identified in the search criteria, and searches search-images to identify matched-images, each search image tagged with a descriptor identifying an item in the search-image and facets of the item in the search-image, wherein the matched-images comprise search-images tagged with descriptors similar to the search descriptor; and receiving the matched-images from the image search service and providing the matched-images for display as search results in response to a search specifying the search criteria input.

14. The system of claim 13 wherein the search criteria comprises a selection by the user of a facet of the first item comprising a color of the first item and a facet of the second item comprising a shape of the second item, and wherein the search descriptor comprises the color of the first item and the shape of the second item.

15. The system of claim 13, wherein the one or more modules are further configured to display the matched-images in ranked order based on similarity between the search descriptor and a respective descriptor of each of the matched-images.

16. The system of claim 13, wherein the descriptor of each search-image comprises a vector of normalized values, each value corresponding to a facet of each search-image.

17. The system of claim 13, wherein the descriptor of each search-image comprises at least one of a character string, a sequence of words, or a set of words.

18. The system of claim 13, wherein each of the one or more different facets of the first item and each of the one or more different facets of the second item comprises at least one of a shape-facet, a color-facet, or a texture-facet.

19. The system of claim 18, wherein the color-facet uniquely identifies a color of the associated item, the texture-facet uniquely identifies a texture of the associated item, and the shape-facet uniquely identifies a shape of the associated item.

20. A non-transitory computer-readable medium on which is encoded program code, the program code comprising computer-executable instructions, which, when executed by a computing device, cause the computing device to perform steps comprising:
  displaying to a user in a single user interface a first image of a first item and a second image of a second item, wherein the first item is a non-background portion of the first image and the second item is a non-background portion of the second image;
  displaying with the first image a plurality of facets of the first item and displaying with the second image a plurality of facets of the second item;
  receiving search criteria input comprising a selection by the user of one or more different facets of the first item and a weight for each of the one or more different facets of the first item and a selection by the user of one or more different facets of the second item and a weight for each of the one or more different facets of the second item;
  communicating the search criteria input to an image search service, wherein the image search service generates a search descriptor based on the different facets and corresponding weights identified in the search criteria input and searches search-images to identify matched-images, each search-image tagged with a descriptor-identifying an item in the search-image and facets of the item in the search-image, wherein the matched-images comprises search-images tagged with descriptors similar to the search descriptor; and
  receiving the matched-images from the image search service and providing the matched-images for display as search results in response to a search specifying the search criteria input.

21. The non-transitory computer-readable medium of claim 20, wherein the search criteria comprises a selection by the user of a facet of the first item comprising a color of the first item and a facet of the second item comprising a shape of the second item, and wherein the search descriptor comprises the color of the first item and the shape of the second item.

22. The non-transitory computer-readable medium of claim 20, wherein the program code comprises further computer-executable instructions, which, when executed by the computing device, cause the computing device to display the matched-images in ranked order based on similarity between the search descriptor and a respective descriptor of each of the matched-images.

23. The non-transitory computer-readable medium of claim 20, wherein generating the search descriptor based on the different facets and corresponding weights identified in the search criteria input comprises combining at least two different facets according to their respective corresponding weights as identified in the search criteria.

24. The non-transitory computer-readable medium of claim 20, wherein the descriptor of each search-image comprises a vector of normalized values, each value corresponding to a facet of each search-image.

25. The non-transitory computer-readable medium of claim 20, wherein the descriptor of each search-image comprises at least one of a character string, a sequence of words, or a set of words.

26. The non-transitory computer-readable medium of claim 20, wherein each of the one or more different facets of the first item and each of the one or more different facets of the second item comprises at least one of a shape-facet, a color-facet, or a texture-facet.

27. The non-transitory computer-readable medium of claim 20, wherein the color-facet uniquely identifies a color of the associated item, the texture-facet uniquely identifies a texture of the associated item, and the shape-facet uniquely identifies a shape of the associated item.

28. The non-transitory computer-readable medium of claim 20, wherein the first image and the second image displayed depict a common item and each image depicts a different aspect of the common item.

29. The non-transitory computer-readable medium of claim 20, wherein the first image and the second image depict different items.

30. The non-transitory computer-readable medium of claim 20, wherein generating the search descriptor based on the different facets and corresponding weights identified in the search criteria input comprises combining all of the different facets according to their respective corresponding weights as identified in the search criteria.

* * * * *